Sept. 13, 1960

C. MICHELSON 2,952,802

ELECTROMAGNETIC RELEASE MECHANISM

Filed Dec. 10, 1957

INVENTOR.

BY Carlyle Michelson

*Roland G. Anderson*

ATTORNEY

United States Patent Office 2,952,802
Patented Sept. 13, 1960

2,952,802
ELECTROMAGNETIC RELEASE MECHANISM

Carlyle Michelson, Oak Ridge, Tenn., assignor to the United States of America as represented by the United States Atomic Energy Commission Filed Dec. 10, 1957, Ser. No. 701,946

3 Claims. (Cl. 317—165)

The present invention relates to means for releasably supporting a safety mechanism which is to be dropped upon receipt of a signal, such as a safety rod for a nuclear reactor, and more especially to a novel support mechanism including an armature adapted to be affixed to the dropable mechanism, an electromagnet, and means associated with the magnet for uniquely defining the air gap between the magnet poles and armature.

In nuclear reactors designed for research purposes, such as the "swimming pool" reactor described in "Research Reactors," Report TID–5275, p. 121, available from the Superintendent of Documents, Washington, D.C., an electrical signal indicative of the neutron flux level in the reactor is used to position a control mechanism. The control rods for the reactor are releasably attached to the control mechanism by electromagnets which are normally energized through a magnet current amplifier. This amplifier provides a magnet current which decreases with increasing reactor power level and also decreases with increased rate of rise of neutron flux, so that when either of the above conditions or a combination thereof occur, the magnet energizing current will fall to a "drop-out level." At that level, the electromagnets are deenergized allowing the control rods to separate from the movable control mechanism, then drop into the reactor, accelerated by gravity and a safety spring. See application Serial No. 357,216, filed May 25, 1953, and assigned to the assignee of this application for a description of such controls.

In order to determine whether a reactor control system is safe for operation, the maximum time required to shut down the reactor after the magnet current "drop-out level" is reached must be known accurately. The support mechanism must be designed to secure the minimum possible release time, in order that the reactor will not run away during release, yet the mechanism must not release the rods unexpectedly due to jars or vibrations so as to shut down the reactor and thus interfere with production or experiments. Moreover, the period of release must be reproducible within the narrow limits. A support mechanism should be adaptable to all known weights of control rods to be supported without disassembly, so that a purchaser or user could adapt one standard mechanism to his individual requirements with minimum effort.

The electromagnetic release mechanism set forth in this application is an improvement over the prior art devices in that it provides rapid, uniform and dependable release with large excess holding forces. Excess holding force is defined as magnet holding force minus accelerating force. The electromagnet of this invention was designed with numerous objectives in mind so that the resultant electromagnet would be universally applicable for both present and anticipated pool-type reactors. These objectives were as follows:

Accelerating force (including rod weight) \_\_lbs\_\_ 12–77
Maximum zero power current _____ma\_\_ 60
Minimum excess holding force at zero power
 lbs\_\_ 50
Maximum release time at zero power \_\_\_\_msec\_\_ 10
Maximum release time at 150 ma. _____msec\_\_ 15
Minimum stroke for free fall _____in\_\_ 0.015
Minimum stroke with accelerating mechanism
 in\_\_ 0.005

Stroke is defined as the maximum uniform air gap through which the magnet can exert its accelarating force with 60 ma. magnet current.

In addition, the magnet was to be made a universal one, adaptable to any accelerating force in the design range by a simple machining operation to change the air gap; the release time under water was to be no greater than 50% greater than that in air; and the peak surge voltage during magnet current interruption was to be less than 1650 volts.

Magnet release time, which is the most important consideration of the design of a safety-release mechanism, has two components. One component is the time required for the magnetic field to decay to the armature-release point. The second component is the time required for the armature to pass just beyond the fully retracting influence of the magnetic field as magnet current is reestablished. This second component is a measure of the influence of magnetic and hydraulic effects which appear in the neighborhood of the magnet face as the armature starts to move. In order to obtain fast magnetic release, it is necessary to decay the magnetic field quickly. Since the magnet core is a good electrical conductor, and is linked by a large percentage of the flux lines, eddy currents are induced in the core whenever the magnetic field changes. These currents, in turn, establish a magnetic field which tends to oppose the change; thus, in effect delaying the change. I have found that, for a given initial flux density and decay function, a reduction in eddy current power density can be achieved by increasing the resistivity of the pole material and by decreasing the pole radius. In order to utilize the advantage to be gained by an increase of resistivity, I have utilized a ferronickel alloy (Allegheny lundum ferronickel—53% Fe, 47% Ni) to replace the ingot iron normally used. This results in a reduction of the release time by a factor of three. A second improvement, equivalent to decreasing the pole radius, has been accomplished by slotting the poles, as will be discussed in a subsequent description of the drawings. This produced another reduction in the release time by a factor of about two.

The hydraulic effects which contribute to slow initial rate of magnet armature movement are due to restrictions imposed upon the design. Generally the design specifications call for small physical size and large holding forces; thus it is necessary to design the electromagnet with a small air gap. This, in turn, necessitates a near complete contact fit between the armature and magnet faces, which results in excluding water from the faces when the mechanism is disposed under water. When the surfaces are separated, a void is temporarily formed and a pressure differential then is created relative to the under-surface of the armature and results in a measurable decelerating force, even in air. As will be shown in more detail in a description of figures, this problem has been substantially alleviated by limiting the area of contact between the magnet and armature surfaces to only that required for the magnetic circuit. This feature also has the advantage of minimizing the surface upon which deposits may form which might alter the air gap and result in a change of performance characteristics. In addition, the design of the armature is such as to provide ready entrance of fluid into any void that might tend to form.

It is an object of this invention to provide an improved electromagnetic release mechanism, one embodiment of which is adapted for use with control rods in a nuclear reactor.

It is a further object of this invention to provide an electromagnetic release mechanism with minimum release characteristics and with large excess holding forces.

It is still a further object of this invention to provide an improved electromagnet and associated armature with improved hydraulic release characteristics.

These and other objects and advantages will be apparent from a consideration of the following detailed specifications and the accompanying drawings wherein.

Figure 1:
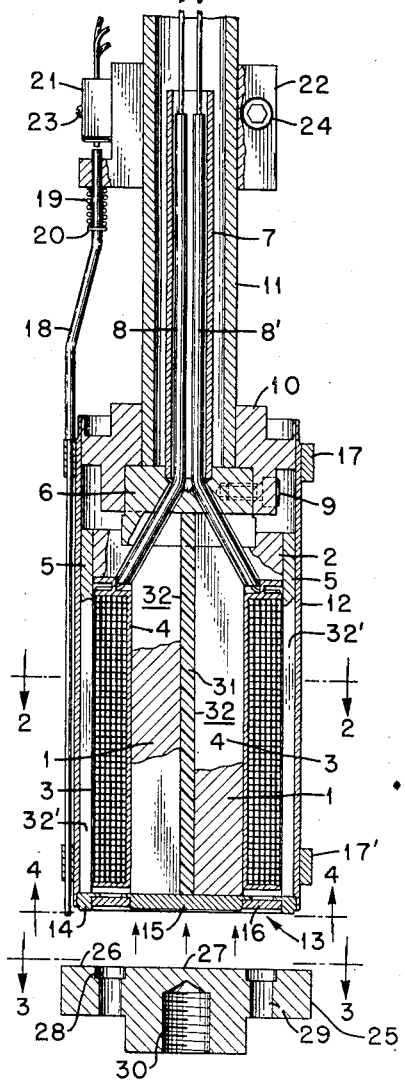
Fig. 1 shows a longitudinal cross-sectional view of the electromagnet.

Referring now to Fig. 1, a central core or pole piece 1, fabricated from suitable magnetic material and formed with an enlarged upper end 2, is surrounded with a cylindrical electromagnet coil 3. This coil 3 is fabricated with triple formex wire wound on an insulating bobbin 4. The coil 3, in turn, is encircled with a cylindrical outer core or pole 5 of suitable magnetic material. This outer pole is joined at its upper end, to the upper end 2 of the inner pole 1 in any suitable manner such as welding. The inner and outer poles are slotted after assembly so as to provide a plurality of magnets. All voids between the thus formed magnets and between the coil and the poles are filled with a waterproof and insulating "potting" material such as Araldite (an epoxy resin). Suitably attached to the top of the magnet poles is a non-magnetic yoke support 6 to which is attached a lead-in conduit 7 through which pass the coil leads 8, 8'. A magnet support unit comprising a collar 10 and an extension tube 11 is removably secured by means of socket head cap screws 9 to the top of the yoke support 6. The lead-in conduit 7 is filled with a waterproof and insulating "potting" material such as Araldite and is provided to ensure a long leakage path for any moisture that may enter the extension tube 11. The annulus around the conduit 7 serves to collect any condensation that may occur within the extension tube 11. The entire magnet unit is encased in a waterproof container. This container comprises the magnet support collar 10, a cylindrical shell 12, and a magnet face plate 13. The face plate 13 has three components: an outer annular ring 14 of magnetic material; an inner disc 15 of magnetic material; and a washer 16 of non-magnetic material which magnetically insulates the ring 14 from the disc 15. It will be noted that the exterior face of the disc 15 is slightly recessed from the exterior face of the ring 14. This spacing provides the necessary air gap to produce the proper magnetic characteristics of my electromagnet. The face plate may be fabricated by silver-soldering the washer 16 into an annular groove of a disc of magnetic material. The rough face plate is silver-soldered to the shell 12 and is then machined to produce a smooth surface. The shell 12 is seal-welded to the collar 10 when all components have been properly assembled. Two guide rings 17, 17' are secured to the outer surface of the shell 12 and serve as guides for the magnet can within a guide tube, not shown, as well as guides for a conventional clutch switch actuating rod 18. This rod 18 is normally held in a downward position by a spring 19 acting upon a retaining ring 20. Downward travel of the rod is limited by a shoulder of the rod contacting the upper guide ring 17. In the upward position, the rod 18 actuates a conventional clutch switch 21 which is fastened to a switch mounting collar 22 with a machine screw 23. The mounting collar 22 is, in turn, secured on the extension tube 11 by a cap screw 24.

Figure 2:
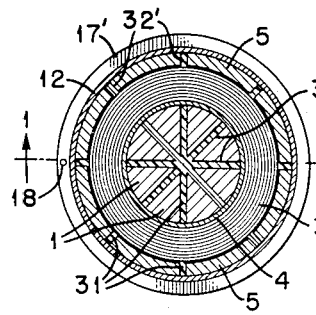
Fig. 2 shows a transverse cross-sectional view through the line 2—2 of Fig. 1.

Also shown in Fig. 1, is a cross sectional view of the magnet armature 25. The face of the armature is divided into an annular outer ring surface 26 and an inner disc surface 27 by an annular groove 28. A plurality of apertures 29 are provided which communicate between the groove 28 and the back of the armature 25, as shown. A central threaded recess 30 is provided on the back of the armature for the attachment of the armature to control rod units. The voids between the segments and the slots 32 and 32' are filled with potting material 31. This is clearly shown in Fig. 2. The cross-sectional view as shown in Fig. 2 clearly sets forth the segmentation of the pole pieces and the structural relationship between the poles 1 and 5 and the coil 3.

Figure 3:
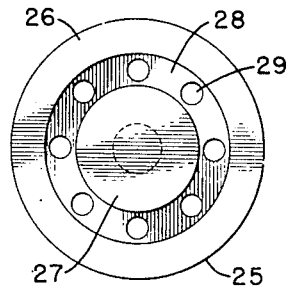
Fig. 3 shows a view of the face of the armature as indicated by the line 3—3 of Fig. 1.

Fig. 3 more clearly shows the relationship of the ring 26, disc 27, the recess 28 and the apertures 29.

Figure 4:
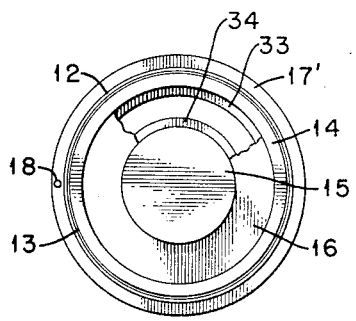
Fig. 4 shows a view of the face of the container for the electromagnet as indicated by the line 4—4 of Fig. 1.

Fig. 4 more clearly shows the relationship of the magnetic ring 14 and disc 15, and the non-magnetic washer 16 which is welded in place against the shoulders 33 and 34 of the ring 14 and disc 15, respectively.

Figure 5:
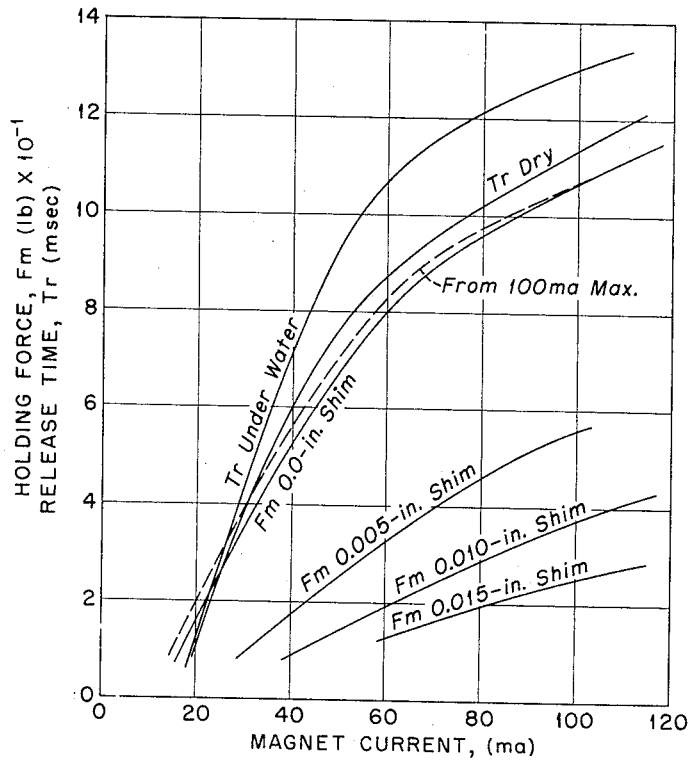
Fig. 5 shows a graph of some of the operating characteristics of the electromagnet of this invention.

In Fig. 5 there is shown a graph on which is plotted some characteristic curves of the holding force or release time against magnet current. The curves shown are for a 12 pound rod attached to the armature, and the magnet poles are slotted and made of ferronickel. From a comparison of the curves it can be seen that the release time of the magnet under water is slightly greater than in air. The holding force for the magnet is in direct proportion to the thickness of a shim placed between the magnet and the armature, as is evidenced by a comparison of the holding force curves.

Figure 6:
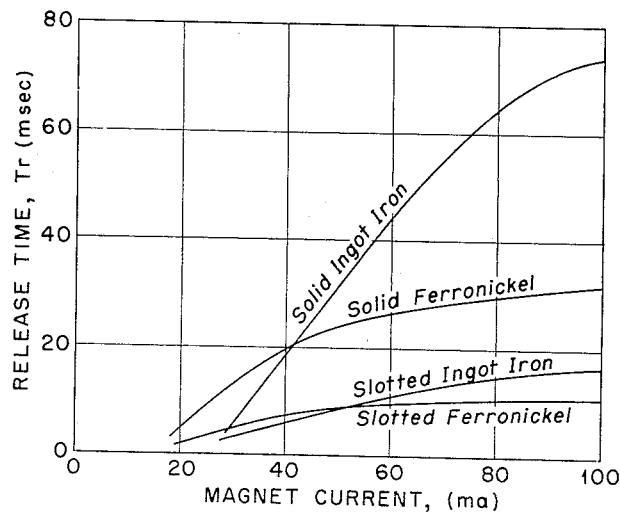
Fig. 6 shows a graph of the release characteristics of electromagnets using ferronickel and ingot iron as pole pieces.

In Fig. 6, there is shown a graph on which is plotted the release characteristic curves for solid and slotted ingot iron pole pieces and for solid and slotted ferronickel pole pieces. It can be seen that the slotted ferronickel pole pieces produce the best release characteristics.

As pointed out above, the small physical size and large holding force required for most magnets necessitates a very small but accurately controlled air gap. As shown in Fig. 1 this air gap is the amount that the surface of the annular ring 14 projects beyond the surface of the disc 15. Calibration of the magnet has shown that an air gap of 0.015 inch is satisfactory for a 12 pound accelerating force when ferronickel alloys are used. This is another advantage of using this alloy, for with the high coercive intensity ingot iron the release time is substantially more dependent upon the air gap. Thus, the air gap, when using ferronickel alloy, may fluctuate over a greater range, due to a slight non-mating of components, deposits, etc., without affecting the release time as much as when other materials are utilized. Also, a 250% increase in zero power magnet current to the magnet increases the release time only about 50%. In addition, in this particular design, the desired gap can readily be reestablished by machining. For an accelerating force of 77 pounds, no air gap is required.

The assembly of my electromagnet is critical to the successful operation of the same. The precautions that must be taken, however, are similar to those that exist for prior art magnets: the principal ones being to ensure good mechanical alignment and a waterproof assembly. Of course, precautions are also necessary to provide proper electrical insulation particularly in view of the large voltage surge when the magnet current is interrupted. High voltage insulation is used throughout in the construction of the magnet, and external circuitry protection is added in the form of thyrite resistors (not shown) in the magnet amplifier. These resistors, although they increase the release time, have been selected to limit the peak voltage surge to 1650 volts. This was chosen as an approximate optimum between the advantage of voltage limiting and disadvantage of increasing release times.

The performance characteristics of two electromagnets of this invention (one for 12 pound accelerating force and one for 77 pound accelerating force) have been evaluated in both air and water. The results are compared in the following table:

| | | |
|---|---|---|
| Accelerating force | 12 lb | 77 lb. |
| Air gap | 0.015 in | 0. |
| Zero power current | 55 ma | 54 ma. |
| Excess holding force at zero power | 59 lb | 53 lb. |
| Release time at zero power | 10.2 msec | 4.5 msec. |
| Release time at 150 ma | 15.5 msec | 7 msec. |
| Stroke | 0.020 in | 0.004 in. |
| Release time under water | 20% increase | no increase. |

Thus, it may be seen that the only modification required in the magnet for the two types of operation is the change in the air gap, and any intermediate operation required can be carried out by varying this air gap as desired.

This invention has been described by way of illustration rather than limitation, and it should be apparent that the invention is equally applicable in fields other than those described.

What is claimed is:

1. In an electromagnetic release mechanism comprising an inner cylindrical ferronickel magnet pole, an outer annular ferronickel magnet pole, an electrical coil wound on a bobbin disposed between said poles, a sleeve disposed about said outer pole, means for connecting said coil to a source of electrical power, and a weight supporting armature having a flat contact face, the improvement wherein both of said magnet poles comprise a plurality of separate segments and a potting resin disposed between said segments to hold said segments in position relative to each other, said resin interrupting current flow between any two of said segments to substantially reduce eddy current losses in said poles; an inner magnetic disc contacting said inner pole, an outer magnetic ring contacting said outer pole, and a non-magnetic annular ring mounted between said disc and said magnetic ring, said outer ring being affixed to said sleeve, and being of greater thickness than said inner magnetic disc to provide a selected air gap between said armature face and said magnetic disc to thus provide a selected holding force and a quick release.

2. The improvement set forth in claim 1, in which said armature face confronting said disc is provided with an annular groove which registers with said non-magnetic annular ring, and with a plurality of longitudinal passageways communicating between said groove and the opposite face of said armature to allow fluid flow into and away from said air gap, thereby substantially eliminating any pressure differential across said armature as it falls away upon release and aiding in the fast release of said armature.

3. In an electromagnet comprising an inner cylindrical ferronickel magnet pole, an outer annular ferronickel magnet pole, an electrical coil wound on a bobbin disposed between said poles, a sleeve disposed about said outer pole, and means for connecting said coil to a source of electrical power, the improvement wherein both of said magnet poles comprise a plurality of separate individual segments insulated from each other, a potting resin disposed between said segments to hold said segments in position relative to each other, an inner magnetic disc contacting the lower end of said inner pole, an outer magnetic ring contacting the lower end of said outer pole, and a non-magnetic annular ring mounted between said disc and said magnetic ring, said outer magnetic ring being affixed to said sleeve and being from .015 to .005 inch greater in thickness than said inner magnetic disc, said segmented poles substantially reducing eddy currents therein, said reduced currents and the low residual magnetic characteristics of said pole pieces providing a fast release characteristic for said electromagnet while the difference in thickness between said inner magnetic disc and said outer magnetic ring provides a selected strong holding force for said electromagnet.

References Cited in the file of this patent

UNITED STATES PATENTS

| | | |
|---|---|---|
| 1,124,796 | Pape | Jan. 12, 1915 |
| 1,852,614 | Johnson et al. | Apr. 5, 1932 |
| 2,092,316 | Lane | Oct. 21, 1933 |
| 2,184,199 | Stephan | Dec. 19, 1939 |
| 2,442,016 | Poole | May 25, 1948 |
| 2,539,547 | Mossman et al. | Jan. 30, 1951 |